US012118848B2

(12) United States Patent
Palmisano

(10) Patent No.: US 12,118,848 B2
(45) Date of Patent: *Oct. 15, 2024

(54) SYSTEMS, APPARATUS, AND METHODS FOR UNLOCKING HIGHER RTP GAMES

(71) Applicant: Aristocrat Technologies, Inc., Las Vegas, NV (US)

(72) Inventor: Angelo Palmisano, Henderson, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,460

(22) Filed: Sep. 7, 2023

(65) Prior Publication Data

US 2023/0419776 A1 Dec. 28, 2023

Related U.S. Application Data

(63) Continuation of application No. 17/058,531, filed as application No. PCT/US2019/053398 on Sep. 27, 2019, now Pat. No. 11,798,356.

(Continued)

(51) Int. Cl.
*G07F 17/32* (2006.01)

(52) U.S. Cl.
CPC ...... *G07F 17/3237* (2013.01); *G07F 17/3213* (2013.01); *G07F 17/3255* (2013.01); *G07F 17/3267* (2013.01)

(58) Field of Classification Search
CPC ............. G07F 17/3213; G07F 17/3237; G07F 17/3244; G07F 17/3255; G07F 17/3267
See application file for complete search history.

(56) References Cited

U.S. PATENT DOCUMENTS

| | | | |
|---|---|---|---|
| D259,499 | S | 6/1981 | Dunham |
| 5,342,518 | A | 8/1994 | Posner |

(Continued)

FOREIGN PATENT DOCUMENTS

| | | | |
|---|---|---|---|
| AU | 630112 | B | 3/1993 |
| AU | 1997022551 | A1 | 8/1997 |

(Continued)

OTHER PUBLICATIONS

"Cashman Casino," Sep. 2018 screenshot from YouTube video. Publication date Apr. 4, 2017, 1 page.

(Continued)

*Primary Examiner* — Milap Shah
(74) *Attorney, Agent, or Firm* — Armstrong Teasdale LLP

(57) ABSTRACT

An electronic gaming machine for providing player access to a higher return to player (RTP) wagering games is provided. The electronic gaming machine includes at least one memory device and at least one processor in communication with the at least one memory device. The at least one processor executes instructions to store a plurality of wagering games, including a first wagering game with a first RTP and a second wagering game with a second RTP. The first RTP and the second RTP are different. The at least one processor also executes instructions to execute the first wagering game, receive a player identifier from a player, determine that the player has access to the second wagering game based, at least in part, on the player identifier, and execute the second wagering game for the player.

20 Claims, 4 Drawing Sheets

Related U.S. Application Data

(60) Provisional application No. 62/741,739, filed on Oct. 5, 2018.

(56) References Cited

U.S. PATENT DOCUMENTS

| | | | |
|---|---|---|---|
| 5,560,603 | A | 10/1996 | Seelig |
| 5,664,998 | A | 9/1997 | Seelig |
| 5,755,621 | A | 5/1998 | Marks |
| 5,767,854 | A | 6/1998 | Anwar |
| 5,779,242 | A | 7/1998 | Kaufmann |
| 5,779,549 | A | 7/1998 | Walker |
| 6,039,648 | A | 3/2000 | Guinn |
| 6,082,887 | A | 7/2000 | Feuer |
| 6,093,100 | A | 7/2000 | Singer |
| 6,210,275 | B1 | 4/2001 | Olsen |
| 6,224,486 | B1 | 5/2001 | Walker |
| 6,270,412 | B1 | 8/2001 | Crawford |
| 6,287,202 | B1 | 9/2001 | Pascal |
| 6,293,865 | B1 | 9/2001 | Kelly |
| 6,309,299 | B1 | 10/2001 | Weiss |
| 6,354,592 | B1 | 3/2002 | Virzi |
| 6,425,828 | B2 | 7/2002 | Walker |
| 6,620,045 | B2 | 9/2003 | Berman |
| D492,692 | S | 7/2004 | Fallon |
| 6,817,948 | B2 | 11/2004 | Pascal |
| D499,786 | S | 12/2004 | Dropo |
| 6,908,390 | B2 | 6/2005 | Nguyen |
| 7,354,345 | B2 | 4/2008 | Bortnik |
| 7,393,280 | B2 | 7/2008 | Cannon |
| 7,516,959 | B2 | 4/2009 | Huard |
| D605,725 | S | 12/2009 | Chang |
| 7,682,251 | B2 | 3/2010 | Bortnik |
| 7,684,874 | B2 | 3/2010 | Schlottmann |
| 7,684,882 | B2 | 3/2010 | Baerlocher |
| 7,689,302 | B2 | 3/2010 | Schlottmann |
| 7,690,996 | B2 | 4/2010 | Iddings |
| 7,704,144 | B2 | 4/2010 | Abbott |
| 7,753,790 | B2 | 7/2010 | Nguyen |
| 7,780,520 | B2 | 8/2010 | Baerlocher |
| 7,787,972 | B2 | 8/2010 | Schlottmann |
| 7,798,901 | B2 | 9/2010 | Nguyen |
| 7,824,267 | B2 | 11/2010 | Cannon |
| 7,878,899 | B2 | 2/2011 | Duhamel |
| 7,972,209 | B2 | 7/2011 | Kelly |
| 7,976,389 | B2 | 7/2011 | Cannon |
| 8,002,630 | B2 | 8/2011 | Nguyen |
| 8,021,230 | B2 | 9/2011 | Baerlocher |
| 8,043,157 | B2 | 10/2011 | Cannon |
| 8,070,583 | B2 | 12/2011 | Baerlocher |
| 8,092,309 | B2 | 1/2012 | Bickley |
| 8,142,272 | B2 | 3/2012 | Walker |
| 8,157,647 | B2 | 4/2012 | House |
| 8,192,270 | B2 | 6/2012 | Slomiany |
| 8,202,165 | B2 | 6/2012 | Duhamel |
| 8,246,434 | B2 | 8/2012 | Moody |
| 8,246,439 | B2 | 8/2012 | Kelly |
| 8,277,298 | B2 | 10/2012 | Mace |
| 8,313,372 | B2 | 11/2012 | Naicker |
| 8,317,620 | B2 | 11/2012 | Kelly |
| 8,342,957 | B2 | 1/2013 | Carpenter |
| 8,382,572 | B2 | 2/2013 | Hoffman |
| 8,419,520 | B2 | 4/2013 | Johnson |
| 8,419,546 | B2 | 4/2013 | Decasa |
| 8,430,736 | B2 | 4/2013 | Cannon |
| 8,439,733 | B2 | 5/2013 | Kay |
| 8,449,386 | B2 | 5/2013 | Englman |
| 8,465,363 | B1 | 6/2013 | Mayeroff |
| 8,469,788 | B2 | 6/2013 | Carpenter |
| 8,485,892 | B2 | 7/2013 | Nguyen |
| 8,506,394 | B2 | 8/2013 | Kelly |
| 8,512,119 | B2 | 8/2013 | Kelly |
| 8,523,682 | B2 | 9/2013 | Bickley |
| 8,540,577 | B2 | 9/2013 | Shvili |
| 8,562,418 | B2 | 10/2013 | Gomez |
| 8,585,481 | B2 | 11/2013 | Owen |
| 8,585,494 | B2 | 11/2013 | Parrinello |
| 8,591,338 | B2 | 11/2013 | Nguyen |
| D694,773 | S | 12/2013 | Sakaguchi |
| D695,778 | S | 12/2013 | Edwards |
| 8,602,877 | B2 | 12/2013 | Carpenter |
| 8,613,650 | B2 | 12/2013 | Kovacs |
| 8,622,793 | B2 | 1/2014 | Ford |
| 8,622,817 | B2 | 1/2014 | Englman |
| 8,641,507 | B2 | 2/2014 | Kelly |
| 8,641,515 | B2 | 2/2014 | Nicely |
| 8,684,830 | B1 | 4/2014 | Chun |
| 8,690,661 | B2 | 4/2014 | Cannon |
| 8,702,499 | B2 | 4/2014 | Johnson |
| 8,702,520 | B2 | 4/2014 | Seelig |
| 8,715,051 | B2 | 5/2014 | Davis |
| 8,715,052 | B2 | 5/2014 | Bennett |
| 8,715,069 | B2 | 5/2014 | Arnone |
| 8,721,421 | B2 | 5/2014 | Tempest |
| 8,734,232 | B2 | 5/2014 | Bunch |
| D706,808 | S | 6/2014 | Edwards |
| D710,372 | S | 8/2014 | Dellinger |
| 8,801,518 | B2 | 8/2014 | Lipscomb |
| 8,808,077 | B1 | 8/2014 | Chun |
| 8,840,462 | B2 | 9/2014 | Patel |
| 8,851,980 | B2 | 10/2014 | Versaci |
| 8,851,981 | B2 | 10/2014 | Ramsey |
| 8,852,001 | B2 | 10/2014 | Kelly |
| 8,870,659 | B2 | 10/2014 | House |
| 8,894,480 | B2 | 11/2014 | Johnson |
| 8,905,841 | B2 | 12/2014 | Carpenter |
| 9,005,010 | B2 | 4/2015 | Watkins |
| 9,011,241 | B2 | 4/2015 | Kelly |
| D730,373 | S | 5/2015 | Clement |
| 9,022,867 | B2 | 5/2015 | Kelly |
| 9,033,786 | B2 | 5/2015 | Kelly |
| D732,054 | S | 6/2015 | Yoneda |
| 9,070,255 | B2 | 6/2015 | Christensen |
| 9,111,416 | B2 | 8/2015 | Cannon |
| 9,123,208 | B2 | 9/2015 | Davis |
| 9,123,210 | B2 | 9/2015 | Bennett |
| D741,897 | S | 10/2015 | Wilkinson |
| 9,155,968 | B2 | 10/2015 | Hedrick |
| 9,159,198 | B2 | 10/2015 | Moshal |
| 9,165,429 | B2 | 10/2015 | Cannon |
| 9,165,430 | B2 | 10/2015 | Bickley |
| 9,171,426 | B2 | 10/2015 | Dimichele |
| 9,177,445 | B2 | 11/2015 | Vemuri |
| 9,214,056 | B2 | 12/2015 | Kovacs |
| D750,113 | S | 2/2016 | Kettner |
| 9,286,756 | B2 | 3/2016 | Bramble |
| D753,158 | S | 4/2016 | Mezzanotte |
| 9,311,773 | B2 | 4/2016 | Chun |
| D759,065 | S | 6/2016 | Mezzanotte |
| 9,361,754 | B2 | 6/2016 | Decasa, Jr. |
| 9,364,753 | B2 | 6/2016 | Bennett |
| 9,384,631 | B2 | 7/2016 | Arnone |
| 9,384,635 | B2 | 7/2016 | Nguyen |
| 9,401,073 | B2 | 7/2016 | Lee |
| D763,904 | S | 8/2016 | Knapp |
| 9,430,908 | B2 | 8/2016 | Owen |
| 9,443,393 | B2 | 9/2016 | Johnson |
| 9,443,394 | B2 | 9/2016 | Carpenter |
| D771,670 | S | 11/2016 | Chan |
| D772,252 | S | 11/2016 | Myers |
| D772,260 | S | 11/2016 | Ingenlath |
| D772,894 | S | 11/2016 | Zhao |
| 9,495,838 | B2 | 11/2016 | Davis |
| 9,520,020 | B2 | 12/2016 | Bickley |
| 9,530,280 | B2 | 12/2016 | Melnick |
| 9,558,632 | B2 | 1/2017 | Melnick |
| D780,201 | S | 2/2017 | Zielinski |
| 9,569,933 | B2 | 2/2017 | Baker |
| 9,607,479 | B2 | 3/2017 | Robbins |
| D783,655 | S | 4/2017 | Hu |
| 9,613,492 | B2 | 4/2017 | Englman |
| 9,616,331 | B1 | 4/2017 | Jordan |
| 9,626,836 | B2 | 4/2017 | Arnone |
| 9,633,509 | B2 | 4/2017 | Cannon |
| D788,167 | S | 5/2017 | Fox Uribe |

(56) References Cited

U.S. PATENT DOCUMENTS 9,656,174 B1 5/2017 Mclellan
9,697,671 B2 7/2017 Moody
9,697,674 B2 7/2017 Morrissette
9,715,790 B2 7/2017 Arnone
9,734,660 B2 8/2017 Kiely
9,747,754 B2 8/2017 Carpenter
D801,990 S 11/2017 Reissner
D804,505 S 12/2017 Hoffman
9,858,750 B2 1/2018 Kovacs
9,984,529 B2 5/2018 Kim
9,990,806 B2 6/2018 Davis
D823,336 S 7/2018 Tinney
10,013,852 B1 7/2018 Jordan
10,032,338 B2 7/2018 Lark
10,055,940 B2 8/2018 Arnone
10,068,432 B2 9/2018 Wortmann
10,109,155 B2 10/2018 Chase
D834,604 S 11/2018 Feldman
D836,653 S 12/2018 Zhou
10,163,305 B2 12/2018 Wortmann
10,195,532 B1 2/2019 Mclellan
10,210,706 B2 2/2019 Penacho
D842,316 S 3/2019 Toth
10,235,841 B2 3/2019 Nguyen
10,255,765 B2 4/2019 Washington
D847,833 S 5/2019 Toth
D849,771 S 5/2019 Foley
D852,830 S 7/2019 Penacho
D854,554 S 7/2019 Toth
10,354,491 B2 7/2019 Melnick
10,360,766 B2 7/2019 Arnone
10,373,442 B2 8/2019 Schlottmann
10,395,474 B2 8/2019 Englman
D858,535 S 9/2019 Evans
10,424,162 B2 9/2019 Heenan
D861,703 S 10/2019 Suslik
D861,710 S 10/2019 Frackelton
10,445,985 B2 10/2019 Davis
10,460,568 B2 10/2019 Givant
D867,391 S 11/2019 Yoshioka
D868,825 S 12/2019 Paulik
D870,123 S 12/2019 Butcher
D870,126 S 12/2019 Crispino
10,504,332 B2 12/2019 Riggs
10,510,215 B2 12/2019 Arnone
10,515,514 B1 12/2019 Weaver
10,540,852 B2 1/2020 Lark
D875,110 S 2/2020 Spors
D876,450 S 2/2020 Suslik
D876,477 S 2/2020 Gansert
D879,122 S 3/2020 Ebler
10,621,829 B2 4/2020 Loader
D889,493 S 7/2020 Schwegler
D890,790 S 7/2020 Marks
D895,645 S 9/2020 Sanborn
D896,256 S 9/2020 Kawaichi
10,789,814 B2 9/2020 Palmisano
D898,769 S 10/2020 Park
D905,106 S 12/2020 Kang
D905,736 S 12/2020 Felkins
10,864,443 B2 12/2020 Eatedali
10,872,492 B2 12/2020 Oberberger
D910,071 S 2/2021 Chen
D913,325 S 3/2021 Chen
D914,056 S 3/2021 Chen
D916,754 S 4/2021 Johnson
D916,903 S 4/2021 Arena
D917,503 S 4/2021 Sakurai
11,055,951 B2 7/2021 La Guardia
11,183,020 B2 11/2021 Berman
11,798,356 B2 * 10/2023 Palmisano .......... G07F 17/3267
2001/0034260 A1 10/2001 Luciano
2001/0054003 A1 12/2001 Chien
2002/0028707 A1 3/2002 Pascal
2002/0119824 A1 8/2002 Allen
2002/0183105 A1 12/2002 Cannon
2003/0050831 A1 3/2003 Klayh
2003/0060264 A1 3/2003 Chilton
2004/0229700 A1 11/2004 Cannon
2005/0020352 A1 1/2005 Chilton
2005/0071024 A1 3/2005 Henshaw
2005/0160003 A1 7/2005 Berardi
2006/0058082 A1 3/2006 Crawford, III
2006/0082056 A1 4/2006 Kane
2006/0148565 A1 7/2006 Gauselmann
2006/0157934 A1 7/2006 Yoseloff
2006/0178202 A1 8/2006 Hughes
2006/0287045 A1 12/2006 Walker
2007/0054741 A1 3/2007 Morrow
2007/0129147 A1 6/2007 Gagner
2007/0191102 A1 8/2007 Coliz
2007/0218968 A1 9/2007 Snow
2007/0218982 A1 9/2007 Baerlocher
2007/0243936 A1 10/2007 Binenstock
2008/0045288 A1 2/2008 Moshal
2008/0070692 A1 3/2008 Schlottmann
2008/0070693 A1 3/2008 Schlottmann
2008/0070694 A1 3/2008 Schlottmann
2008/0070695 A1 3/2008 Baerlocher
2008/0076520 A1 3/2008 Chan
2008/0146305 A1 6/2008 Moody
2008/0207313 A1 8/2008 Acres
2008/0254883 A1 10/2008 Patel
2009/0005150 A1 1/2009 Haveson
2009/0011810 A1 1/2009 Moshal
2009/0011827 A1 1/2009 Englman
2009/0029773 A1 1/2009 Cherry
2009/0061997 A1 3/2009 Popovich
2009/0061999 A1 3/2009 Popovich
2009/0069093 A1 3/2009 Kelly
2009/0104965 A1 4/2009 House
2009/0118000 A1 5/2009 Yoshizawa
2009/0124320 A1 5/2009 Dewaal
2009/0124364 A1 5/2009 Cuddy
2009/0170584 A1 7/2009 Tan
2009/0197659 A1 8/2009 Christensen
2009/0270168 A1 10/2009 Englman
2009/0275374 A1 11/2009 Nelson
2010/0022307 A1 1/2010 Steuer
2010/0035674 A1 2/2010 Slomiany
2010/0062840 A1 3/2010 Herrmann
2010/0070056 A1 3/2010 Coronel
2010/0105470 A1 4/2010 Englman
2010/0120503 A1 5/2010 Hoffman
2010/0197377 A1 8/2010 Aoki
2010/0210356 A1 8/2010 Losica
2010/0210362 A1 8/2010 Toompere
2010/0227686 A1 9/2010 Brunet De Courssou
2010/0311497 A1 12/2010 Suslik
2011/0014964 A1 1/2011 Crowder, Jr.
2011/0028160 A1 2/2011 Roeding
2011/0070940 A1 3/2011 Jaffe
2011/0111856 A1 5/2011 White
2011/0130186 A1 6/2011 Chim
2011/0207525 A1 8/2011 Allen
2011/0263312 A1 10/2011 De Waal
2011/0281624 A1 11/2011 Moody
2012/0122561 A1 5/2012 Hedrick
2012/0129610 A1 5/2012 Mazursky
2012/0225724 A1 9/2012 Barber
2013/0029739 A1 1/2013 Ramsey
2013/0065676 A1 3/2013 Owen
2013/0072294 A1 3/2013 Mosley
2013/0116809 A1 5/2013 Carpenter
2013/0122978 A1 5/2013 Slomiany
2013/0244751 A1 9/2013 Bennett
2013/0252704 A1 9/2013 Gilbertson
2013/0281179 A1 10/2013 Tempest
2013/0296036 A1 11/2013 Scott
2013/0310127 A1 11/2013 Bradley
2013/0331181 A1 12/2013 Newton
2013/0331184 A1 12/2013 Kelly
2013/0331968 A1 12/2013 Newton
2014/0031100 A1 1/2014 Gomez

(56) References Cited

U.S. PATENT DOCUMENTS

| | | | |
|---|---|---|---|
| 2014/0038703 | A1 | 2/2014 | Lampert |
| 2014/0038724 | A1 | 2/2014 | Layne, IV |
| 2014/0051520 | A1 | 2/2014 | Davis |
| 2014/0087815 | A1 | 3/2014 | Caputo |
| 2014/0106866 | A1 | 4/2014 | Hardy |
| 2014/0162787 | A1 | 6/2014 | Carpenter |
| 2014/0194176 | A1 | 7/2014 | Robbins |
| 2014/0274308 | A1 | 9/2014 | Guinn |
| 2014/0323199 | A1 | 10/2014 | Dimichele |
| 2015/0018070 | A1 | 1/2015 | Meyer |
| 2015/0099576 | A1 | 4/2015 | Anderson |
| 2015/0199878 | A1 | 7/2015 | Wright |
| 2015/0206397 | A1 | 7/2015 | Nelson |
| 2015/0228151 | A1 | 8/2015 | Damodaran |
| 2015/0248810 | A1 | 9/2015 | Wortmann |
| 2015/0287069 | A1 | 10/2015 | Gissara |
| 2015/0348361 | A1 | 12/2015 | Adiraju |
| 2015/0355727 | A1 | 12/2015 | Hu |
| 2015/0356815 | A1 | 12/2015 | Kim |
| 2015/0379822 | A1 | 12/2015 | Ellis |
| 2016/0063807 | A1 | 3/2016 | Bennett |
| 2016/0104344 | A1 | 4/2016 | Meyer |
| 2016/0110943 | A1 | 4/2016 | Nicely |
| 2016/0140807 | A1 | 5/2016 | Chase |
| 2016/0148126 | A1 | 5/2016 | Paleja |
| 2016/0217646 | A1 | 7/2016 | Hornik |
| 2016/0275757 | A1 | 9/2016 | Decasa, Jr. |
| 2016/0284157 | A1 | 9/2016 | Marrinson |
| 2016/0328918 | A1 | 11/2016 | De Waal |
| 2017/0161999 | A1 | 6/2017 | Givant |
| 2017/0200349 | A1 | 7/2017 | Englman |
| 2017/0323528 | A1 | 11/2017 | Arnone |
| 2017/0337775 | A1 | 11/2017 | Singer |
| 2018/0052582 | A1 | 2/2018 | Hilbert |
| 2018/0068529 | A1 | 3/2018 | Delekta |
| 2018/0075708 | A1 | 3/2018 | San |
| 2018/0089953 | A1 | 3/2018 | Palmisano |
| 2018/0089954 | A1 | 3/2018 | Carpenter |
| 2018/0095616 | A1 | 4/2018 | Valdivia |
| 2018/0130312 | A1 | 5/2018 | Cire |
| 2018/0146206 | A1 | 5/2018 | Weekes |
| 2019/0019373 | A1 | 1/2019 | Fox |
| 2019/0066446 | A1 | 2/2019 | Mariscal |
| 2019/0073859 | A1 | 3/2019 | Penacho |
| 2019/0080562 | A1 | 3/2019 | Jungmann |
| 2019/0096182 | A1 | 3/2019 | Oberberger |
| 2019/0102993 | A1 | 4/2019 | Washington |
| 2019/0139366 | A1 | 5/2019 | Davis |
| 2019/0147706 | A1 | 5/2019 | Bolling, Jr. |
| 2019/0244482 | A1 | 8/2019 | Washington |
| 2019/0262717 | A1 | 8/2019 | Thielbar |
| 2019/0287344 | A1 | 9/2019 | Oberberger |
| 2019/0333314 | A1 | 10/2019 | Henshaw |
| 2019/0340883 | A1 | 11/2019 | Arnone |
| 2019/0347907 | A1 | 11/2019 | Bolling, Jr. |
| 2019/0378379 | A1 | 12/2019 | Satterlie |
| 2019/0385406 | A1 | 12/2019 | Marks |
| 2020/0043233 | A1 | 2/2020 | Nelson |
| 2020/0043293 | A1 | 2/2020 | Nelson |
| 2020/0043294 | A1 | 2/2020 | Davis |
| 2020/0111293 | A1 | 4/2020 | Oberberger |
| 2020/0184775 | A1 | 6/2020 | Oberberger |
| 2020/0279451 | A1 | 9/2020 | La Guardia |
| 2020/0364987 | A1 | 11/2020 | Weaver |
| 2021/0007632 | A1 | 1/2021 | Blahnik |
| 2021/0256811 | A1 | 8/2021 | Uberuaga |

FOREIGN PATENT DOCUMENTS

| | | | |
|---|---|---|---|
| AU | 1997029346 | A1 | 11/1997 |
| AU | 1997030070 | A1 | 11/1997 |
| AU | 1997035809 | A1 | 1/1998 |
| AU | 700667 | B2 | 1/1999 |
| AU | 2001036378 | A1 | 5/2001 |
| AU | 2001294751 | A1 | 6/2002 |
| AU | 2002311978 | A1 | 12/2002 |
| AU | 755912 | B2 | 1/2003 |
| AU | 2002250161 | A1 | 7/2003 |
| AU | 2003281244 | A1 | 1/2004 |
| AU | 2004904539 | | 8/2004 |
| AU | 2005203403 | A1 | 2/2006 |
| AU | 2005285317 | A1 | 3/2006 |
| AU | 2002306874 | B2 | 6/2006 |
| AU | 2006200237 | A1 | 8/2006 |
| AU | 2007200711 | A1 | 10/2007 |
| AU | 2008100162 | B4 | 4/2008 |
| AU | 2008100163 | B4 | 4/2008 |
| AU | 2006208418 | B2 | 11/2008 |
| AU | 2007211906 | B2 | 2/2009 |
| AU | 2005235004 | B2 | 4/2009 |
| AU | 2008323670 | B2 | 5/2009 |
| AU | 2007216930 | B2 | 3/2010 |
| AU | 2007237214 | B2 | 3/2010 |
| AU | 2008200060 | B2 | 3/2010 |
| AU | 2004267734 | B2 | 7/2010 |
| AU | 2010200449 | A1 | 9/2010 |
| AU | 2005270750 | B2 | 12/2010 |
| AU | 2010202077 | A1 | 12/2010 |
| AU | 2004267733 | B2 | 1/2011 |
| AU | 2004267746 | B2 | 1/2011 |
| AU | 2005203404 | B2 | 3/2011 |
| AU | 2011200529 | A1 | 3/2011 |
| AU | 2010246507 | A1 | 6/2011 |
| AU | 2007200050 | B2 | 9/2011 |
| AU | 2006302141 | B2 | 1/2012 |
| AU | 2005248969 | B2 | 2/2012 |
| AU | 2011205125 | A1 | 3/2012 |
| AU | 2011200434 | B2 | 11/2012 |
| AU | 2010202282 | B2 | 1/2013 |
| AU | 2012268860 | A1 | 1/2013 |
| AU | 2008312413 | B2 | 9/2013 |
| AU | 2013254911 | A1 | 11/2013 |
| AU | 2014900096 | | 1/2014 |
| AU | 2013202667 | B2 | 1/2015 |
| AU | 2015201979 | A1 | 5/2015 |
| AU | 2012326136 | B2 | 6/2015 |
| AU | 2015200050 | A1 | 7/2015 |
| AU | 2013213728 | B2 | 1/2016 |
| AU | 2011307385 | B2 | 3/2016 |
| AU | 2016203321 | A1 | 6/2016 |
| AU | 2016204577 | A1 | 7/2016 |
| AU | 2014395471 | A1 | 1/2017 |
| AU | 2014317574 | B2 | 6/2017 |
| AU | 2014317575 | B2 | 6/2017 |
| AU | 2016349725 | A1 | 6/2018 |
| AU | 2018203786 | A1 | 6/2018 |
| AU | 2018203839 | A1 | 6/2018 |
| CA | 2340562 | A1 | 8/2002 |
| CA | 2536018 | A1 | 3/2005 |
| CA | 2920520 | A1 | 3/2005 |
| CA | 2538706 | A1 | 4/2005 |
| CA | 2259197 | C | 9/2005 |
| CA | 2253884 | C | 11/2005 |
| CA | 2563942 | A1 | 11/2005 |
| CA | 2580187 | A1 | 3/2006 |
| CA | 2522944 | A1 | 7/2006 |
| CA | 2527367 | A1 | 5/2007 |
| CA | 2527416 | A1 | 5/2007 |
| CA | 2403035 | C | 7/2007 |
| CA | 2572719 | A1 | 7/2007 |
| CA | 2604412 | A1 | 4/2008 |
| CA | 2617034 | A1 | 7/2008 |
| CA | 2691337 | A1 | 8/2010 |
| CA | 2812377 | A1 | 4/2012 |
| CA | 2838347 | A1 | 12/2012 |
| CA | 2852464 | A1 | 4/2013 |
| CA | 2876890 | A1 | 7/2015 |
| CA | 2947448 | A1 | 11/2015 |
| CA | 2956084 | A1 | 1/2016 |
| CA | 2535880 | C | 4/2016 |
| CA | 2599635 | C | 8/2016 |
| CA | 2535838 | C | 9/2016 |
| CA | 2941629 | A1 | 3/2017 |
| CA | 3004490 | A1 | 5/2017 |

(56) References Cited

FOREIGN PATENT DOCUMENTS

| | | | |
|---|---|---|---|
| CA | 3017742 | A1 | 9/2017 |
| CA | 3017745 | A1 | 9/2017 |
| CA | 2655095 | C | 4/2018 |
| CN | 1853203 | A | 10/2006 |
| CN | 1853204 | A | 10/2006 |
| CN | 1853205 | A | 10/2006 |
| CN | 101018592 | A | 8/2007 |
| CN | 101043923 | A | 9/2007 |
| CN | 101044523 | A | 9/2007 |
| CN | 101044525 | A | 9/2007 |
| CN | 101321564 | B | 7/2011 |
| DE | 19740287 | A1 | 3/1998 |
| EP | 1021228 | A4 | 1/2001 |
| EP | 1296294 | A3 | 2/2004 |
| EP | 1644902 | A2 | 4/2006 |
| EP | 1656647 | A1 | 5/2006 |
| EP | 1656648 | A1 | 5/2006 |
| EP | 1677263 | A3 | 4/2007 |
| EP | 1794721 | A1 | 6/2007 |
| EP | 1903522 | A1 | 3/2008 |
| EP | 1912185 | A1 | 4/2008 |
| EP | 1933960 | A2 | 6/2008 |
| EP | 2003630 | A1 | 12/2008 |
| EP | 1740281 | A4 | 2/2009 |
| EP | 1814091 | A3 | 2/2009 |
| EP | 2218487 | A3 | 8/2010 |
| EP | 2435995 | A1 | 4/2012 |
| EP | 2723462 | A4 | 11/2014 |
| EP | 2621595 | A4 | 6/2015 |
| EP | 3171951 | A4 | 12/2017 |
| EP | 3149713 | A4 | 2/2018 |
| EP | 3429710 | A2 | 1/2019 |
| EP | 3429711 | A1 | 1/2019 |
| GB | 2387950 | A | 10/2003 |
| GB | 0409224 | | 4/2004 |
| GB | 2401063 | B | 10/2006 |
| GB | 2427149 | B | 3/2007 |
| HK | 1237704 | A | 4/2018 |
| IL | 216538 | A | 2/2012 |
| IN | 201847034966 | | 9/2018 |
| JP | 2007502658 | A | 2/2007 |
| JP | 2007502659 | A | 2/2007 |
| JP | 2007502661 | A | 2/2007 |
| JP | 5941152 | B2 | 6/2016 |
| JP | 2017518850 | A | 7/2017 |
| MO | I000434 | A | 2/2008 |
| MO | I000877 | A | 3/2009 |
| MO | I001296 | C | 5/2016 |
| MO | I001298 | C | 5/2016 |
| NZ | 703662 | A | 7/2015 |
| PH | 12018501052 | A1 | 1/2019 |
| RU | 96117375 | C1 | 9/1999 |
| SG | 131166 | A1 | 5/2007 |
| SG | 11201401444 | S | 5/2014 |
| SG | 10201500175 | | 8/2015 |
| SG | 11201803977 | W | 6/2018 |
| TW | 573262 | B | 1/2004 |
| WO | 1997027921 | A1 | 8/1997 |
| WO | 1997039811 | A1 | 10/1997 |
| WO | 1997041933 | A1 | 11/1997 |
| WO | 1998000210 | A1 | 1/1998 |
| WO | 2001032276 | A3 | 2/2002 |
| WO | 2003059472 | A1 | 7/2003 |
| WO | 2002094399 | A8 | 8/2003 |
| WO | 2002027676 | A8 | 9/2003 |
| WO | 2003083796 | A1 | 10/2003 |
| WO | 2004004853 | A2 | 1/2004 |
| WO | 2005020165 | A1 | 3/2005 |
| WO | 2005020166 | A1 | 3/2005 |
| WO | 2005020164 | A3 | 4/2005 |
| WO | 2005030353 | A3 | 4/2005 |
| WO | 2005102480 | A1 | 11/2005 |
| WO | 2006015442 | A1 | 2/2006 |
| WO | 2006031439 | A1 | 3/2006 |
| WO | 2005110563 | A3 | 1/2007 |
| WO | 2007044785 | A3 | 4/2007 |
| WO | 2007050119 | A3 | 7/2007 |
| WO | 2007087297 | A3 | 7/2008 |
| WO | 2007146791 | A3 | 12/2008 |
| WO | 2009006274 | A1 | 1/2009 |
| WO | 2009052300 | A1 | 4/2009 |
| WO | 2009062187 | A1 | 5/2009 |
| WO | 2009086466 | A3 | 7/2009 |
| WO | 2009108805 | A3 | 9/2009 |
| WO | 2010011673 | A1 | 1/2010 |
| WO | 2009135086 | A3 | 2/2010 |
| WO | 2010054061 | A1 | 5/2010 |
| WO | 2010098808 | A1 | 9/2010 |
| WO | 2010137010 | A1 | 12/2010 |
| WO | 2011019949 | A9 | 11/2011 |
| WO | 2012044559 | A1 | 4/2012 |
| WO | 2013059372 | A3 | 4/2013 |
| WO | 2013052453 | A3 | 5/2014 |
| WO | 2014074271 | A1 | 5/2014 |
| WO | 2014210080 | A1 | 12/2014 |
| WO | 2015172060 | A1 | 11/2015 |
| WO | 2015183335 | A8 | 12/2015 |
| WO | 2016014266 | A1 | 1/2016 |
| WO | 2017079706 | A1 | 5/2017 |
| WO | 2017160910 | A1 | 9/2017 |
| WO | 2017160917 | A3 | 12/2017 |
| WO | 2019125422 | A1 | 6/2019 |
| WO | 2019168646 | A1 | 9/2019 |
| ZA | 201500185 | B | 12/2015 |

OTHER PUBLICATIONS

"House of Fun," Sep. 2018 screenshot from web page: "https://www.houseoffun.com/play-now/," 1 page.

Office Action dated May 14, 2020 for U.S. Appl. No. 16/290,836 (pp. 1-5).

Office Action dated Jul. 20, 2020 for U.S. Appl. No. 16/290,833 (pp. 1-9).

Notice of Allowance dated Jun. 17, 2020 for U.S. Appl. No. 29/682,178 (pp. 1-10).

"Gold Stacks 88 Lunar Festival Slot—Nice Session, All Features!" Feb. 14, 2019, YouTube, site visited May 27, 2020: https://www.youtube.conn/watch?v=kusOLt2fvM4 (Year: 2019) 1 page.

"Figures and Polygons" Sep. 15, 2008, Themathleague, site visited May 27, 2020: https://www.mathleague.com/index.php/ connponent/content/article/3 1-nnathleaguewebsite/genera l/75-figuresandpolygons#octagon (Year: 2018) 2 pages.

"Catherine Wheels, Fireworks, android/ios game" Oct. 24, 2015, YouTube, site visited May 27, 2020: https://www.youtube.com/watch?v=DzCYicyl FJA (Year: 2015) 1 page.

"Golden Firework Video Slot Casino Game with a "Mega Win" Free Spin Bonus" Apr. 16, 2018, YouTube, site visited May 27, 2020: https://www.youtube.conn/watch?v=YgCbY7c-nYM (Year: 2018) 1 page.

"Lucky Firecracker slot game [Wild Jackpots]" Jan. 30, 2015, YouTube, site visited May 27, 2020: https://www.youtube.com/watch?v=Gzfe182Qtbc (Year: 2015) 1 page.

Office Action dated Jun. 23, 2020 for U.S. Appl. No. 29/682,179 (pp. 1-11).

"iSoftBet—Scrolls of Ra HD" May 8, 2015, YouTube, site visited Jun. 16, 2020: https://www.youtube.conn/watch?v=9ZciLdlqQNo (Year: 2015) 1 page.

"New Game  Fortune Scroll  Slot Lover" Feb. 11, 2019, YouTube, site visited Jun. 16, 2020: https://www.youtube.conn/watch?v=cdCsvzzRHvs&list=LLMFvEIKJd5VZ1hOwZ7BZDdQ&index=2873 (Year: 2019) 1 page.

"Hot Shot Twin Fire Live Play with many features BALLY Slot Machine" Jan. 8, 2017, YouTube, site visited Jun. 16, 2020: https://www.youtube.com/watch?v=b_03gJvQecw (Year: 2017) 1 page.

"Traditional Torah Icon" Feb. 6, 2018, Alamy, site visited Jun. 16, 2020: https://www.alamy.com/ stock-photo-traditional-torah-icon-174149305.htnnl (Year: 2018) 1 page.

"Paper Scroll Clip Art" Dec. 11, 2017, FavPNG, site visited Jun. 16, 2020: https://favpng.com/png_view/ paper-scroll-clip-art-png/DDpwDsEh (Year: 2017) 3 pages.

(56) References Cited

OTHER PUBLICATIONS

"Torah Scroll Icon" Jun. 25, 2018, Depositphotos, site visited Jun. 16, 2020: https://depositphotos.com/201375256/stock-illustration-torah-scroll-icon-outline-style.html (Year: 2018) 1 page.
Legato, Frank, "Tourney Time", Global Gaming Business Magazine, Mar. 22, 2019, retrieved from internet on Oct. 7, 2019, https://ggbmagazine.com/article/tourney-time/, 20 pages.
Office Action dated Aug. 18, 2020 for U.S. Appl. No. 29/703,046 (pp. 1-12).
Countdown Timer Background 10 Seconds, by Kanadaka, YouTube [online], published on Dec. 16, 2013, [retrieved on Aug. 13, 2020], retrieved from the Internet <URL: https://www.youtube.com/watch?v=AwOYH3RDUe4> (Year: 2013) 1 page.
3 2 1 GO! Countdown Green Screen, by Da24Gemini, YouTube [online], published on Sep. 15, 2012, [retrieved on Aug. 13, 2020], retrieved from the Internet <URL: https://www.youtube.com/watch?v=WJhxCcx1 M4g> (Year: 2012) 1 page.
Candy Words—Match Word Puzzle Game, by Homer S, YouTube [online], published on Mar. 5, 2019, [retrieved on Aug. 13, 2020], retrieved from the Internet <URL: https://www.youtube.com/watch?v=4TsGNDLrpWk> (Year: 2019) 1 page.
Notice of Allowance dated Aug. 26, 2020 for U.S. Appl. No. 16/290,836 (pp. 1-8).
Notice of Allowance dated Oct. 7, 2020 for US App. No. 29/682,179 (pp. 1-7).
Office Action dated Nov. 12, 2020 for U.S. Appl. No. 16/290,833 (pp. 1-8).
Notice of Allowance dated Jan. 7, 2021 for U.S. Appl. No. 29/703,046 (pp. 1-9).
Office Action dated Jan. 27, 2021 for U.S. Appl. No. 16/290,838 (pp. 1-9).
International Search Report and Written Opinion for App. No. PCT/US19/53398, dated Jan. 6, 2020, 9 pages.
International Search Report and Written Opinion for App. No. PCT/US19/53407, dated Jan. 9, 2020, 8 pages.
Notice of Allowance dated Mar. 15, 2021 for U.S. Appl. No. 16/290,833 (pp. 1-8).
International Preliminary Report on Patentability for App. No. PCT/US2019/053407, dated Apr. 15, 2021, 8 pages.
Office Action dated May 11, 2021 for U.S. Appl. No. 16/946,113 (pp. 1-14).
Notice of Allowance dated May 19, 2021 for U.S. Appl. No. 29/703,046 (pp. 1-8).
Supplemental Notice of Allowability dated Jun. 7, 2021 for U.S. Appl. No. 16/290,833 (pp. 1-2).
Office Action (Final Rejection) dated Aug. 5, 2021 for U.S. Appl. No. 16/290,838 (pp. 1-7).
Corrected Notice of Allowability dated Aug. 18, 2021 for U.S. Appl. No. 29/703,046 (pp. 1-4).
Office Action (Notice of Allowance and Fees Due (PTOL-85)) dated Oct. 21, 2021 for U.S. Appl. No. 16/946,113 (pp. 1-5).
Office Action (Notice of Allowance and Fees Due (PTOL-85)) dated Nov. 9, 2021 for U.S. Appl. No. 16/290,838 (pp. 1-7).
IP.com NPL Search Strategy (Year: 2021).
Office Action (Non-Final Rejection) dated Dec. 27, 2021 for U.S. Appl. No. 17/058,548 (pp. 1-32).
Office Action (Non-Final Rejection) dated Apr. 1, 2022 for U.S. Appl. No. 17/058,531 (pp. 1-15).
Office Action (Final Rejection) dated Oct. 12, 2022 for U.S. Appl. No. 17/058,531 (pp. 1-11).
Office Action (Non-Final Rejection) dated Mar. 25, 2022 for U.S. Appl. No. 17/304,107 (pp. 1-7).
Office Action (Final Rejection) dated Apr. 12, 2022 for U.S. Appl. No. 17/058,548 (pp. 1-18).
Office Action (Non-Final Rejection) dated May 6, 2022 for U.S. Appl. No. 16/948,961 (pp. 1-16).
Office Action (Non-Final Rejection) dated May 24, 2022 for U.S. Appl. No. 16/946,114 (pp. 1-8).
Office Action (Non-Final Rejection) dated Jun. 9, 2022 for U.S. Appl. No. 16/948,846 (pp. 1-7).
Office Action (Non-Final Rejection) dated Jun. 22, 2022 for U.S. Appl. No. 16/946,116 (pp. 1-16).
Office Action (Notice of Allowance and Fees Due (PTOL-85)) dated Jul. 27, 2022 for U.S. Appl. No. 16/948,846 (pp. 1-7).
Office Action (Final Rejection) dated Jul. 27, 2022 for U.S. Appl. No. 17/304,107 (pp. 1-8).
Office Action (Non-Final Rejection) dated Jul. 21, 2022 for U.S. Appl. No. 16/946,117 (pp. 1-6).
Office Action (Notice of Allowance and Fees Due (PTOL-85)) dated Aug. 8, 2022 for U.S. Appl. No. 17/058,548 (pp. 1-13).
Office Action (Non-Final Rejection) dated Dec. 29, 2022 for U.S. Appl. No. 17/058,531 (pp. 1-11).
Office Action (Notice of Allowance and Fees Due (PTOL-85)) dated Jun. 7, 2023 for U.S. Appl. No. 17/058,531 (pp. 1-5).
Australian Examination Report No. 1 issued in App. No. AU2023203873, dated Aug. 11, 2024, 2 pages.

* cited by examiner

SYSTEMS, APPARATUS, AND METHODS FOR UNLOCKING HIGHER RTP GAMES

CROSS REFERENCE TO RELATED APPLICATIONS

This application is a continuation of and claims priority to U.S. patent application Ser. No. 17/058,531, filed Nov. 24, 2020, which claims priority to International Application No. PCT/US19/53398, filed Sep. 27, 2019, which claims priority to U.S. Provisional Patent Application No. 62/741,739, filed Oct. 5, 2018, all of which are hereby incorporated by reference in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

The proliferation of digital entertainment options is increasing pressure to compete for the attention of gaming patrons. Additionally, loyalty club members may demand more from gaming operators based, for example, on their standing in a player's club (or loyalty club), and/or based on their in-game play. One or more game features to provide a richer experience to a player according to his or her performance at the game are therefore desirable. For example, exclusive graphics, exclusive gameplay characteristics, and/or exclusive or improved pay tables are desirable. Further, games that offer an engaging, memorable experience that drives a sense of accomplishment and exclusivity, ultimately leading to a higher loyalty to the games and operators that offer these one or more game features, are also desirable.

BRIEF DESCRIPTION

An electronic gaming machine for providing player access to a higher return to player (RTP) wagering games is provided. The electronic gaming machine stores a plurality of wagering games, where the different wagering games have different RTPs. The electronic gaming machine executes a first wagering game with a first RTP. When the electronic gaming machine receives a player identifier from a player, the electronic gaming machine determines that the player has access to the second wagering game. Then the electronic gaming machine executes the second wagering game for the player.

A system for providing player access to a higher return to player (RTP) wagering games on an electronic gaming machine is provided. The server stores a plurality of RTP access levels associated with a plurality of players. When the server receives, from an electronic gaming machine, a message including player identifier, the server determines an RTP access level associated with the player identifier. The server then transmits, to the electronic gaming machine, the determined RTP access level for the player. The electronic gaming machine executes a wagering game associated with the determined RTP access level.

A method for providing player access to a higher return to player (RTP) wagering game on an electronic gaming machine is provided. The method includes providing a control instruction to the electronic gaming machine that causes the electronic gaming machine to display, on a display of the electronic gaming machine, an initial wagering game which is associated with an initial RTP. The method also includes determining that a player of the initial wagering game satisfies at least one eligibility criterion. Satisfaction by the player of the at least one eligibility criterion is a prerequisite to granting the player access to a higher RTP wagering game. An indication that the player has been granted access to the higher RTP wagering game is persistently stored in response to determining that the player has satisfied the at least one eligibility criterion. The electronic gaming machine is instructed to display, on its display, the higher RTP wagering game.

DETAILED DESCRIPTION

An electronic gaming machine (EGM) includes a plurality of games with different returns to player (RTP). When a player starts to play on the EGM, they are presented with a default, or base game. The player may then be upgraded to a different game with a higher RTP based on a plurality of factors, including loyalty program tier, in casino spending, and in game behavior. In the exemplary embodiment, the player enters an identification card into the EGM. The EGM communicates with a back-end server to determine which game to present to the player. Once the determination is made, the EGM presents the game, or games, that the player has qualified for. In some embodiments, the EGM may present all of the games that the player has qualified for and allow the player to choose which to play. Each higher RTP game may include additional graphics, different pay tables, additional bonus game and base play options, and/or any other options to present to the player. When the player leaves the EGM, the selected game is stopped and the base game is presented on the EGM.

Figure 1:
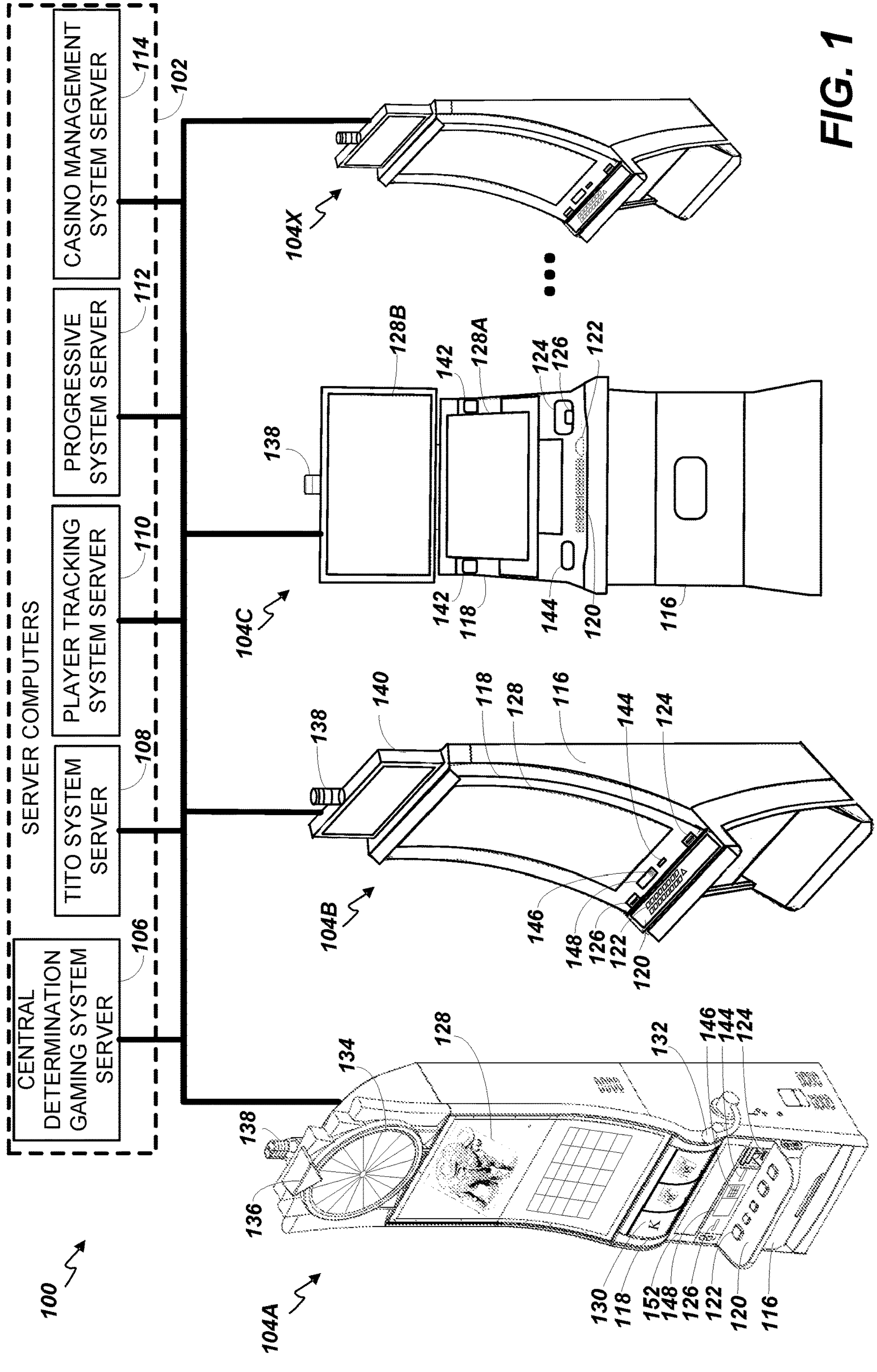
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door (not shown) which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
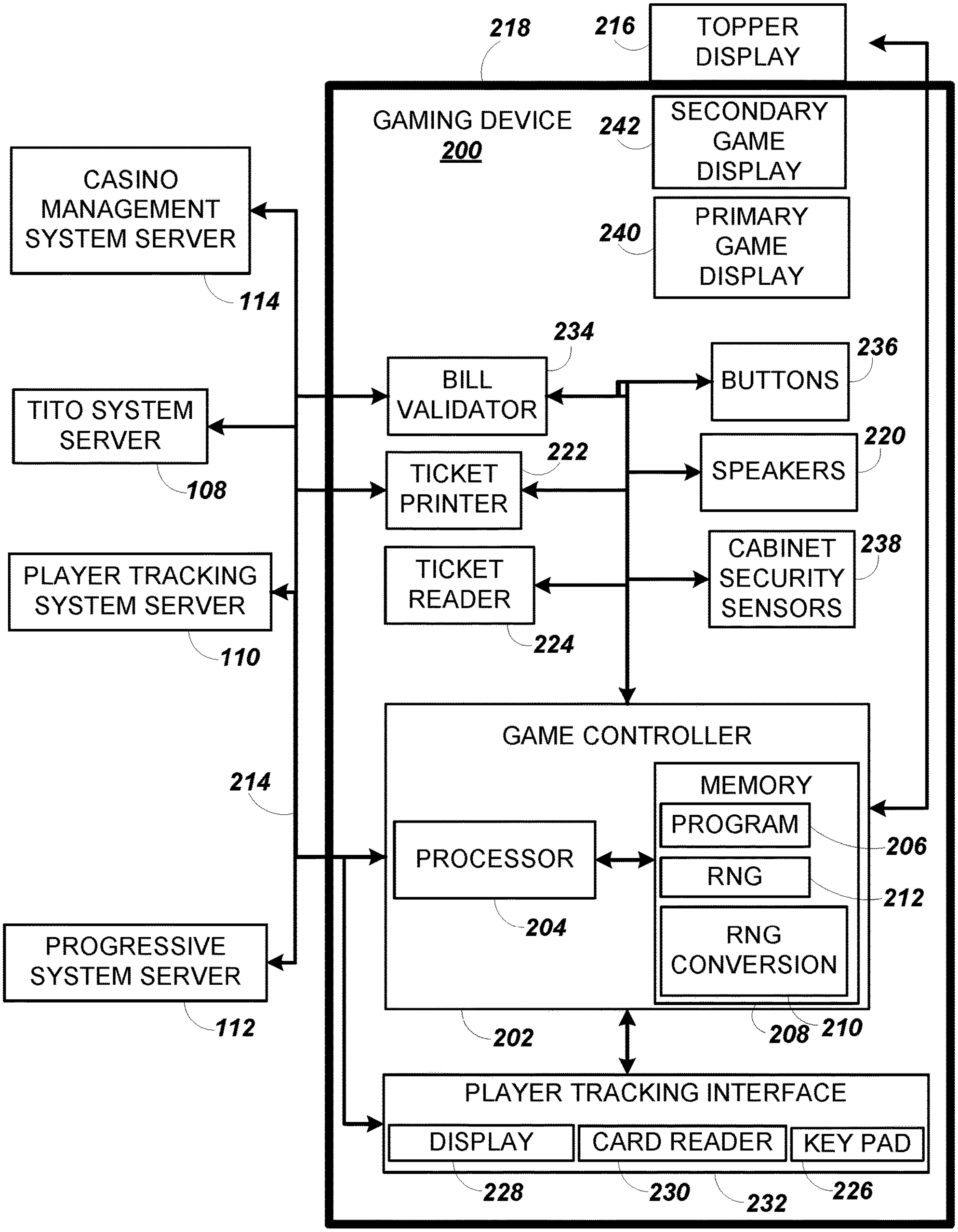
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

An alternative example gaming device 104B illustrated in FIG. 1 is the Ara™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door (not shown) which opens to provide access to the interior of the gaming device 104B. The main or service door (not shown) is typically used by service personnel to refill the ticket-out printer 126 and collect bills and tickets inserted into the bill validator 124. The main or service door (not shown) may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. Game developers could vary the degree of true randomness for each RNG (e.g., pseudorandom) and utilize specific RNGs depending on game requirements.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 3:
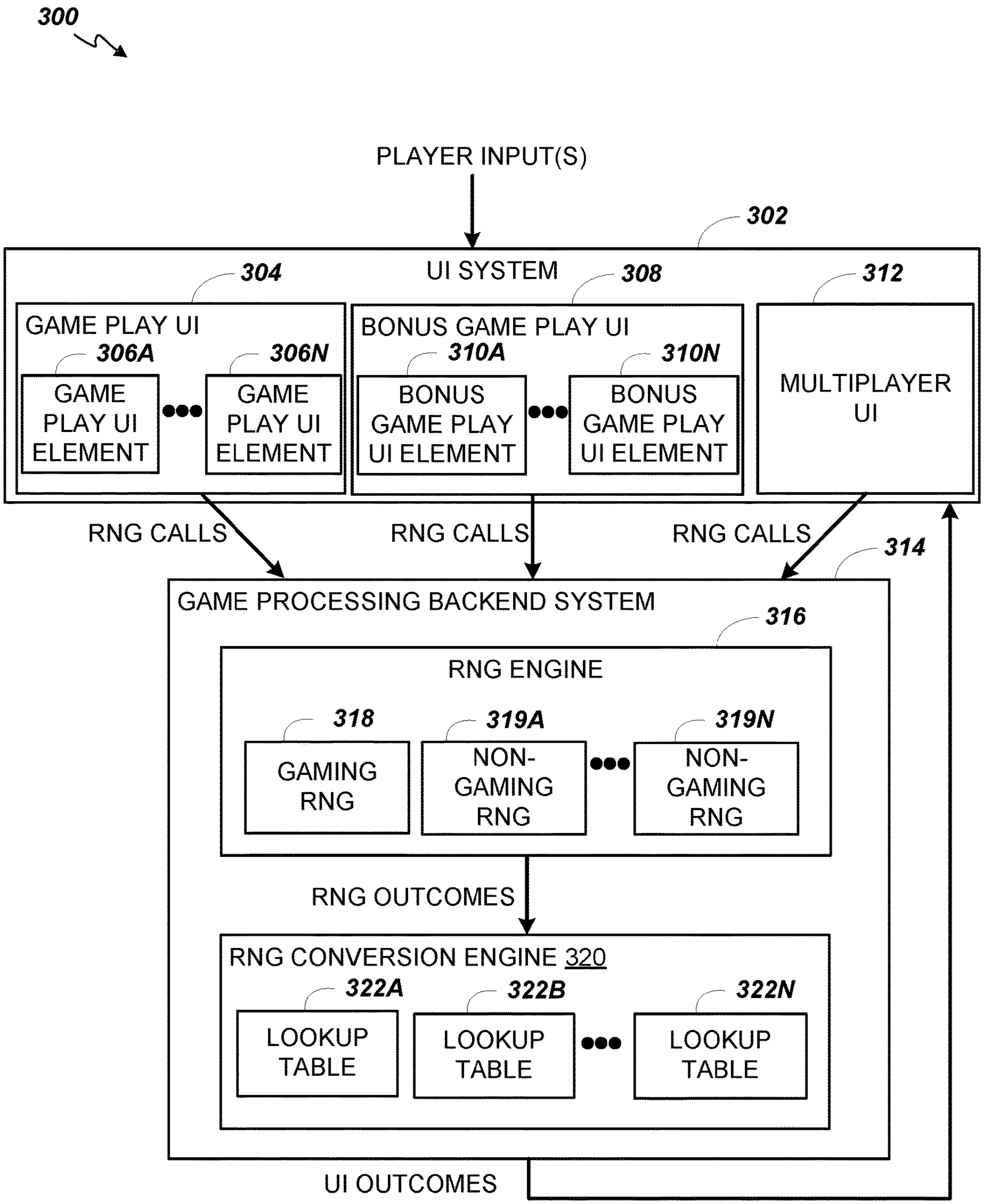
FIG. 3 illustrates, in block diagram form, an embodiment of a game processing architecture that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI elements 306A-306N are similar to the bonus game play UI elements 310A-310N. In other embodiments, the game play UI elements 306A-306N can differ from to the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computational less expensive. Non-gaming RNGS 319A-319N can, thus, be used to generate outcomes for non-gaming purposes. As an example, non-gaming RNGs 319A-319N can generate random numbers for generating random messages that appear on the gaming device. The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome to the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbol combinations to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to the updating the appropriate UI, the player may subsequently provide additional player inputs to initiate a subsequent game instance that progresses through the game processing pipeline.

Figure 4:
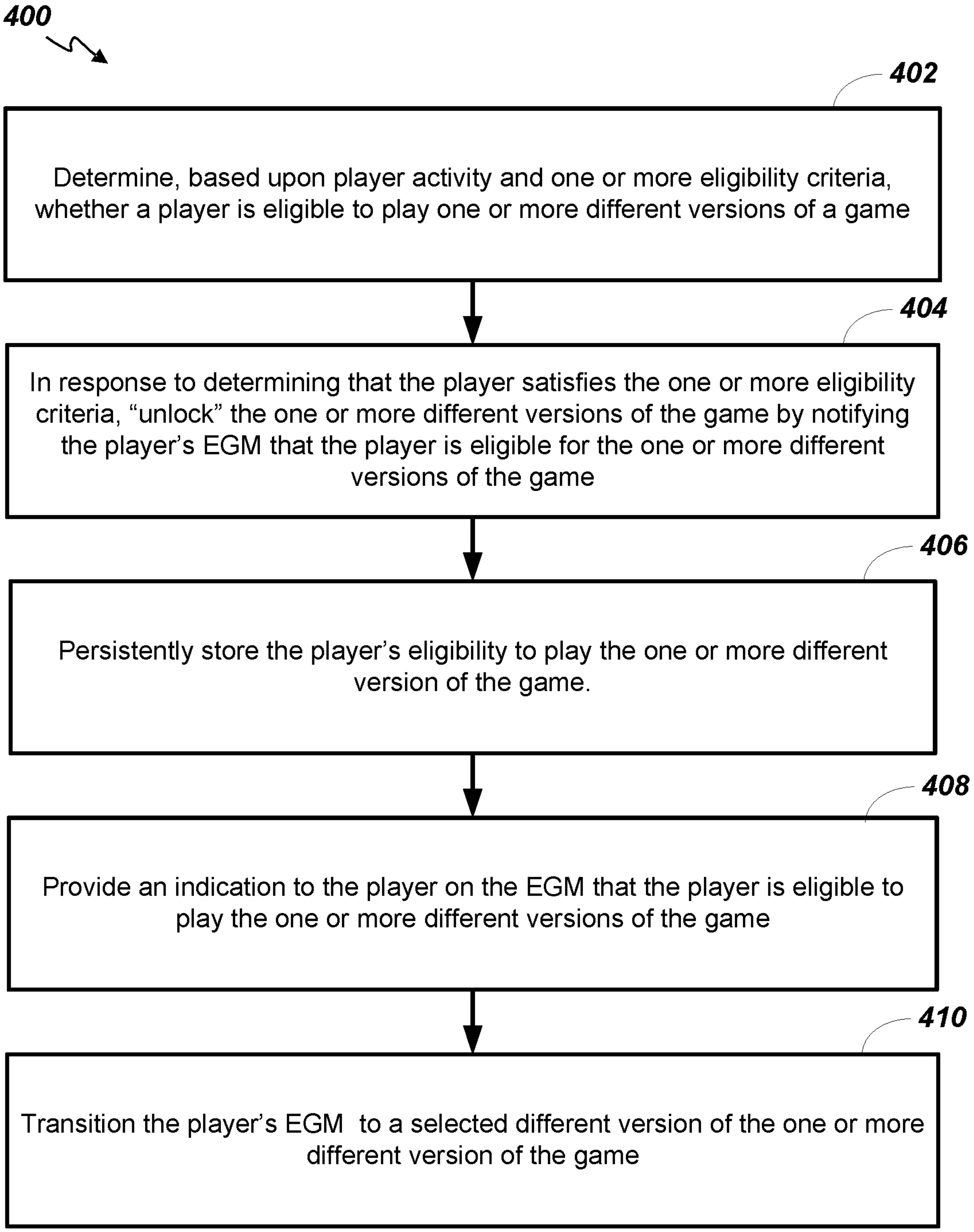
FIG. 4 is a flowchart illustrating an exemplary process for unlocking a different, higher RTP, version of a game for a player who meets at least one eligibility criterion for unlocking the different version.

FIG. 4 is a flowchart illustrating an exemplary process 400 for unlocking a different game (or a plurality of different games) for a player who meets at least one eligibility criterion for unlocking the different games. As described herein, and in various embodiments, a different game may provide a higher return-to-player (RTP) than a default or base game. To illustrate, in one example, a default or base game may be initially displayed or provided on an EGM 104A-104X. This default game may be associated with an initial RTP and may be available to all players whether or not they are associated with one or more loyalty programs.

As players come and go from the EGM 104A-104X, they may be presented, at least initially, with this default game. However, when a player of the EGM 104A-104X satisfies one or more eligibility criteria, as described in greater detail below, a higher RTP game (or a plurality of higher RTP games) may be "unlocked" and provided to the player. As a result, players, including other players who may only be watching a player who has unlocked a higher RTP game, may be inspired to satisfy one or more of a variety of eligibility criteria, such as joining a player's club, to obtain access to higher RTP games.

In various embodiments, a higher RTP game may include a variety of features or awards that result in a higher RTP. For example, in some embodiments, a higher RTP game may include a longer duration bonus round, one or more larger game awards, access to progressive jackpots that are not accessible or available in lower RTP games, one or more increased multipliers, additional wild symbols, additional free games when free games are awarded, physical prizes (e.g., smartphones, tablet computing devices, and/or any other suitable prize), complimentary items or services (e.g., free or reduced price night stays at a casino hotel, free or reduced priced services offered by a casino, etc.) and the like. In another embodiment, a player may select (e.g., "favorite") one or more redeemable items or prizes for use in a higher RTP game. In such a case, as the player logs into the wagering game, a progressive, a paytable, and/or another feature or award may be replaced with one or more of the selected or favorited items, such that the redeemable item or items are no longer redeemable but actually offered as prizes within the wagering game dynamics. Accordingly, and in general, a higher RTP game may include any award or feature that provides a player a higher return, on average and over time, in comparison to a lower RTP game. In addition, in some embodiments, as described above, a player may select one or more items or prizes, irrespective of RTP, for use in a wagering game.

In some embodiments, these higher RTP games are based on other games, for example a buffalo themed game may have multiple different RTP games based on this theme. This may include, but is not limited to, a base buffalo game, a silver buffalo game, a gold buffalo game, a platinum buffalo game, and a high-end buffalo game. Each of these games may have a progressively higher RTP. These games are presented solely for example purposes.

To provide the functionality described herein, an EGM 104A-104X may store each game, such as, for example, in a memory 208 of the EGM 104A-104X. A backend server, such as any of servers 106-114, may monitor player activity on an EGM 104A-104X (e.g., by receiving player activity data from the EGM 1041A-104X) to determine whether and when to unlock a higher RTP game (or a plurality of higher RTP games) on the EGM 104A-104X. In response to such a determination, a backend server 106-114 may provide a control instruction to the EGM 104A-104X that causes the EGM 104A-104X to unlock (and so make available) the one or more higher RTP games. Furthermore, each one of these games is a separate game for meeting regulation requirements and only one of these games is executing on an EGM 104A-104X at a time. When a player qualifies for and activates a higher RTP game, the base game is deactivated and the higher RTP game is activated on the EGM 104A-104X.

Accordingly, in the exemplary embodiment, a backend server, such as any of servers 106-114 and/or any other backend server or backend computing system, may determine, based upon player activity received from an EGM 104A-104X, whether a player satisfies one or more eligibility criteria (step 402). As described above, these eligibility criteria may be established to grant a player access to one or more higher RTP games, and may include any suitable eligibility criteria. In at least one embodiment, a graphical user interface may be provided to a casino administrator for establishing or setting these eligibility criteria. Thus, eligibility criteria may be flexibly established or customized by a casino operator via a graphical user interface provided for that purpose.

In various embodiments, eligibility criteria may be established in connection with any player attribute and/or any gameplay activity associated with a player. For example, in one embodiment, eligibility criteria may include a player loyalty program level (or another membership level), coin-in during a particular gaming session played on an EGM 104A-104X, one or more wager amounts placed during a gaming session, player expenditures at a casino, a restaurant of a casino, a hotel of a casino, player expenditure at a reserved or VIP area of a casino, player expenditure within a casino over a duration of time (e.g., over one or more days, over a weekend, etc.) and/or any other criteria a casino operator may wish to establish as a prerequisite to providing the player access to one or more higher RTP games.

In addition, in at least some embodiments, a plurality of higher RTP games may be individually associated with a variety of eligibility criteria. For example, a first higher RTP game may be associated with a first plurality of eligibility criteria, while a second higher RTP game is associated with a second plurality of eligibility criteria. Such an example is described in greater detail below (see Example 2 below).

To determine whether a player satisfies one or more eligibility criteria, a backend server 106-114 may compare data received from an EGM 104A-104X to the one or more eligibility criteria associated with one or more higher RTP games. For example, a backend server 106-114 may compare a player attribute, such as a player loyalty level, to a loyalty level criterion established for and stored in connection with each of a plurality of higher RTP games. Likewise, a backend server 106-114 may compare a coin-in (e.g., a total dollar or credit amount wagered) by a player during a gaming session to one or more coin-in criteria established for and stored in connection with each of a plurality of higher RTP games.

In various embodiments, coin-in may be provided to a backed server 106-114 by an EGM 104A-104X. Similarly, in least some embodiments, a player loyalty level may be determined based upon a player ID. Specifically, an EGM 104A-104X may provide a player ID (such as a player loyalty club ID) to a backend server 106-114, which the EGM 104A-104X may retrieve or read from a player tracking card inserted within a player tracking interface 232 of the EGM 104A-104X, and which the backend server 106-114 may use to retrieve or look-up one or more player attributes. More particularly, the backend server 106-114 may store a player profile (which may include a plurality of player attributes) in association with a player ID. When the backend server receives the player ID, the backend server 106-114 may use the player ID to retrieve or look-up the player attributes associated with the player of the EGM 104A-104X.

Thus, a backend system, such as any of servers 106-114, may determine whether a player of an EGM 104A-104X satisfies one or more eligibility criteria established for and stored in association with one or more higher RTP games. In various embodiments, and in response to determining that a player satisfies the eligibility criteria associated with at least one or more higher RTP games, a backend server, such as any of servers 106-114, may provide a control instruction to the EGM 104A-104X of the player to "unlock" the one or more higher RTP games qualified for by the player (step 404).

Further, in at least the exemplary embodiment, the backend server 106-114 may persistently store a value, a flag, etc. (e.g., any indicator) to indicate that the player has satisfied one or more eligibility criteria (step 406). Similarly, in at least some embodiments, the backend server 106-114 may persistently store an indication of the one or more higher RTP games that a player has unlocked.

Accordingly, during gameplay, a player may terminate a gaming session, such as, for example, to take a break, to obtain a meal, to rest or sleep, and the like. However, when the player returns to the EGM 104A-104X, and/or any other EGM 104A-104X networked to the backend server 106-114, the backend server 106-114 may unlock the one or more higher RTP games for which the player previously qualified, such that the player is not required to again satisfy the eligibility criteria associated with these games.

In various embodiments, a server 106-114 may persistently store such a pre-qualification for any period of time, such as, for example, any period set or established by a casino operator. After the expiration of the period of time, the server 106-114 may purge or otherwise relinquish the prequalification from computer memory (or simply store an indication in memory that the prequalification was obtained and has expired), such that, after the period expires, the player must meet the necessary eligibility criteria once again.

In some embodiments, the player's EGM 104A-104X may display a variety of celebration graphics, such as for example, to indicate that the player has been granted access to the one or more higher RTP games (step 408). For example, the EGM 104A-104X may display a celebration to indicate that a player is eligible for a longer bonus round, additional wilds, additional free games, a larger payout or game award, a progressive jackpot not available in a lower RTP game, and the like. Similarly, in some embodiments, an onscreen message may be provided that explicitly informs a player of the availability of one or more higher RTP games. Further still, in various embodiments, any other indication, such as an audible, visual, haptic, and/or any other suitable indication may be provided to signal that a player has gained access to one or more higher RTP games.

As described more briefly above, a player may unlock a single higher RTP game, or a plurality of higher RTP games may be simultaneously unlocked. In either case, the player's EGM 104A-104X may transition the player to a higher RTP game, such as, for example, in response to a player selection of a higher RTP game from a list of higher RTP games (e.g., where the player unlocks multiple games) or automatically, such as, for example, when a player unlocks a single higher RTP game (step 410). Further, in some embodiments, even when a player only unlocks a single higher RTP game, the player may still be prompted to select the higher RTP game before the EGM 104A-104X transitions to the game (e.g., because the player may for some reason wish to remain in the lower RTP game or to provide increased player excitement in allowing the player to choose the higher RTP game).

In some embodiments, the player may unlock access to a higher RTP game during gameplay. In these embodiments, the EGM 104A-104X may present one or more messages indicating that the player has unlocked a higher RTP game. The EGM 104A-104X may ask the player whether or not they wish to move to the higher RTP game. In other embodiments, the EGM 104A-104X may automatically transition the player to the higher RTP game.

In some embodiments, each of the plurality of games has a different look from the base game, and potentially, from each other. For example, the base game may have a particular color, theme, or visual icon that is displayed. In a higher RTP game, one or more of these options may have changed to differentiate the game and notify the player and the viewers that this is different from the base game.

In some embodiments, the player may be able to make one or more customization to a game based on their loyalty tier level or other eligibility requirement. For example, the player may be able to change one or more colors of the game. Additionally, the player may have access to a special bonus game, where a symbol in the game has been changed to an image they chose, such as their avatar picture. For example, if the player collects five of their special symbols, they are granted access to a special bonus game. This personalizes the gameplay for the player.

In some additional embodiments, the EGM 104A-104X may store a plurality of games, where multiple games have the same RTP. The player may have the option to choose one of those games. For example, when a player has unlocked access to a second level of RTP games the EGM 104A-104X and the backend server 106-114 may determine the second level RTP games. Then the EGM 104A-104X may display a list of the second level RTP games to the player, for the player to choose which game to play. The player may also have the option to close the game that they are currently playing and choose another game from the list. In some of these embodiments, the player has indicated that one of the games is the player's favorite and the EGM 104A-104X automatically displays the favorite game when the player inserts their card.

In some further embodiments, the backend server 106-114 may receive instructions to provide a player a preview of a higher RTP game. In these embodiments, the backend server 106-114 may instruct the EGM 104A-104X to offer the player a chance to play one of the higher RTP games for a predetermined period of time or number of spins. In some of these embodiments, the player may be required to pay an additional coin in per game of the higher RTP game. For example, a backend server 106-114 may allow a player to redeem loyalty program points to temporarily access the higher RTP game.

In addition, in the exemplary embodiment, when a player terminates a gaming session in which the player has gained access to a higher RTP game, the EGM 104A-104X may return to a default or base game, such as, for example, to prepare for gameplay by a new or different player. When the new or different player inserts his or her player tracking card, as described herein, a backend server 106-114 may analyze the player's gameplay and/or profile data to determine whether to unlock one or more higher RTP games, as described herein.

In some embodiments, each EGM 104A-104X stores a plurality of games where different games are associated with different RTP values and where different games are associated with different RTP access levels. For example a first EGM 104A-104X has a buffalo theme and includes a 90% RTP game, a 92% RTP game, and a 95% RTP game and a second EGM 104A-104X has a dragon theme and includes a 91% RTP game, a 93% RTP game, and a 94.5% RTP game. In these embodiments, the lowest RTP game is associated with the initial access level, the next highest RTP games are associated with the second access level, and the highest RTP games are associated with the highest access level. When the EGM 104A-104X receives the access level for the player, the EGM 104A-104X determines which game to activated based on the game associated with that access level.

Several non-limiting examples (including explanation of some of the features and advantages described above) are provided below for illustrative purposes.

Example 1

This example uses a Buffalo-themed game.

The computing platform, as shown at FIG. 1 and FIG. 2, may concurrently host multiple Buffalo games, with one of the games marked as the "default" game, as described above. The "default" Buffalo game may appear outwardly to be identical in every way to existing Buffalo games already deployed in the field. Uncarded players (i.e., "unidentified" players or players who do not possess or at least insert a player tracking card) may only have access to the "default" Buffalo game.

The system (e.g., one or more backend servers 106-114) may maintain a list of available games (e.g., through discovery of the games on an EGM 104A-104X via a communication protocol, such as SAS, G2S, etc).

In at least some embodiments, an administrator (such as a casino operator) may have the ability to define: (1) an ordinal rank of the games (e.g., by default, the rank may be determined by the RTP of the game), and (2) eligibility criteria, as described above, to grant a player access to each "premium" (or higher RTP) game on a given EGM 104A-104X. As described above, in at least some embodiments, at least one criterion may be a player's tier assignment in the loyalty club system (e.g., as described with respect to Example 2 below, "uncarded," "blue tier," silver tier," gold tier," "diamond tier," "black tier," etc).

Upon insertion of a player card, such as in player tracking interface 232, the system (e.g., a backend server 106-114 and/or in some cases an EGM 104A-104X) may determine the player's eligibility for access to one or more higher RTP or "premium" (e.g., non-default) games, and may, in addition, send a message to the EGM 104A-104X to indicate which game ID (associated with a higher RTP game) should be made available to the player.

Upon receiving this notification, at the first available opportunity, an onscreen message may appear on the gaming machine to inform the player that he or she has been granted access to a "premium" or higher RTP game. In some embodiments, the player's EGM 104A-104X may (1) display a list of all available games based on the player's eligibility, and/or (2) simply transition the player into the "premium" game based on the player's eligibility as determined by the system. In the exemplary embodiment, the player's EGM 104A-104X ends execution of the base game and begins execution of the "premium" RTP game.

After being placed into a new "premium" game, a game display of the player's EGM 104A-104X may be updated with the graphics and game mechanics of the "premium" game. The upgrade may include a variety of exciting graphics and features that are prominently displayed to the player so as to generate excitement that differentiates the experience from play on the "basic" or default (e.g., lowest RTP) game them. In some embodiments, an explicit explanation of the game and its benefits are made accessible to the player, such as via a message, side bar, or special menu presented to the player.

The proposed responsibilities of the Game platform (e.g., the EGM 104A-104X) and the System (e.g., the server 106-114), respectively, are shown below. It will be appreciated, however, that responsibilities between the Game platform and System may vary from one embodiment to another.

Game platform: (1) Concurrently host a variety of "games", each with its own gameplay experience and paytable. Each game may have an ordinal "rank" or sequence based on RTP value; (2) Instead of allowing player selection of the game, the game platform may accept a message from the system that informs the game platform of the game for which an identified player is eligible (based on configuration in the system); (3) Report available games to the system, including associated RTP of each; (4) Report game play in near real-time via SAS (or another protocol), with the game ID on which the game play occurred.

System: (1) Maintain configuration data for each available game within an EGM 104A-104X ("asset"). Additionally, store an ordinal rank of the games on an EGM 104A-104X based on their RTP, as well as criteria mechanics for granting access to a particular game (in at least some embodiments, player tier assignment, as described above, may be sufficient); (2) Record activity in a database when it is reported by the platform (via SAS or other protocol), such that it is later reportable for a game or for an asset as an aggregate; (3) Record player reinvestment/earnings ("Points", "comps" and other loyalty mechanics) based on wagers made by a player on a selected game within an asset; (4) Provide comparative and analytic reporting for games and cabinets to identify high-performing games and individual player preferences; (5) Upon insertion of a player card at a multi-game-enabled EGM 104A-104*x*, determine if the player is eligible for access to a 'premium' (e.g., higher RTP) game. If so, send a message to the game platform to inform it of the game to which the player has been granted access; (6) Upon termination of a player session in a premium game, send a message to the associated game platform to return the game to the "default" game.

Example 2

This example continues and expands on the Buffalo-themed game example provided above at Example 1.

Donna is the Marketing director at Winnabunch casino. Donna has installed two of the exciting new Buffalo multi-game cabinets on her slot floor.

Each cabinet has three games: (1) Standard Buffalo (90% RTP), (2) Golden Buffalo (92% RTP) and (3) Diamond Buffalo (95% RTP).

After connecting the games (e.g., the EGMs 1204A-104X) to the System (e.g., at least one backend server 106-114), Donna chooses player tier as the mechanism to control access to the premium games ("Golden Buffalo" and "Diamond Buffalo"). Donna has five player tiers in her loyalty club: Blue, Silver, Gold, Diamond and Black. Donna decides that Blue-tier and Silver-tier players will only have access to the default Buffalo game ("Standard Buffalo").

Donna will grant access to the "Golden Buffalo" game to Gold-tier and Diamond-tier players. Only Black-tier players will have access to "Diamond Buffalo". She configures access accordingly as shown below:

| Game | Qualifying criteria |
|---|---|
| Standard Buffalo (Default) | Uncarded, Blue-tier, and Silver-tier players |
| Golden Buffalo | Gold-tier and Diamond-tier players |
| Diamond Buffalo | Black-tier players |

[Note:
Loyalty programs may have a large number of tier statuses. Mapping of tiers to games may support many-to-many relations in the system]

David, a casual player, doesn't have a player card. When he plays the Buffalo game, he sees Standard Buffalo game content only. However, his wife Nancy is a Gold-tier member. When Nancy inserts her player card at a Buffalo game, the game displays a notice that she has been upgraded to the Golden Buffalo game. When Nancy plays, there are more winning combinations on the paytable, and an occasional Buffalo stampede bonus round occurs in which a Golden Buffalo appears. Nancy likes to play and revels over her great game experience. David is excited by Nancy's gameplay features and is encouraged to sign up for a player card, after which he also works to advance to Gold-tier status.

However, their friend Larry is a big player that holds a Black-tier card. When Larry visits the casino and plays the Buffalo game, the game shows a large variety of exciting graphics and provides a message telling Larry to expect Big Things. The game switches to a special theme that has winning combinations that include a special "Black Buffalo" symbol that is tied to an in-game progressive, and Larry has frequent bonus rounds in which he wins larger payouts. Larry also plays longer and revels in his access at playing the "Black Buffalo" game. In addition, every time Larry plays, a crowd gathers to watch the cool "Black Buffalo" game. As a result, Larry inspires others to work hard to achieve Black-tier status.

In some embodiments, the EGM 104A-104X stores a plurality of wagering games. The plurality of wagering games includes at least a first wagering game with a first RTP and a second wagering game with a second RTP. The first RTP and the second RTP are different, for example the first RTP may be 90% and the second RTP may be 92%. By default, the EGM 104A-104X executes the first wagering game. When the EGM 104A-104X receives a player identifier from a player, the EGM 104A-104X determines if the player has access to the second wagering game based, at least in part, on the player identifier. If the player does have access to the second wagering game, then the EGM 104A-104X executes the second wagering game for the player. In some embodiments, access to the second wagering game is associated with a loyalty program tier and the second wagering game is accessible when the player is at or above the associated loyalty program tier.

In some embodiments, the EGM 104A-104X displays a selection of the first wagering game and the second wagering game to the player and executes the selected wagering game. In some further embodiments, the EGM 104A-104X also stores a third wagering game associated with a third RTP. The EGM 104A-104X may determine that the player has access to the third wagering game and the EGM 104A-104X executes the third wagering game for the player. This may occur while the player is playing the second wagering game.

In some further embodiments, the EGM 104A-104X transmits the player identifier to a remote server and receives a determination that the player has access to the second wagering game from the remote server. In these embodiments, the remote server is programmed to determine that the player has access to the second wagering game based on one or more eligibility criteria. The EGM 104A-104X may transmit one or more player behaviors of the player to the remote server. At least one of the eligibility criteria is based on the one or more player behaviors.

In still further embodiments, the EGM 104A-104X receives an indication that the player has stopped playing. In response, the EGM 104A-104X stops execution of the second wagering game and returns to executing the first wagering game.

In some embodiments, a server, such as backend server 106-114 stores a plurality of RTP access levels associated with a plurality of players. The server 106-114 may receive a message including a player identifier from an EGM 104A-104X. The server 106-114 determines an RTP access level associated with the player identifier and transmits that determined RTP access level for the player to the EGM 104A-104X. The EGM 104A-104X executes a wagering game associated with the determined RTP access level.

In some further embodiments, the server 106-114 stores a plurality of eligibility criteria associated with the plurality of RTP access levels. The server 106-114 then determines an RTP access level associated with each of the plurality of players based on the plurality of eligibility criteria associated with each player. The server 106-114 may receive one or more player behaviors associated with the player and compare those player behaviors to the plurality of eligibility criteria to determine the RTP access level associated with the individual player. The server 106-114 then determines an update to the RTP access level associated with the player based on the comparison and stores the updated RTP access level. The server 106-114 may also transmit the updated RTP access level to the EGM 104A-104X. The eligibility criteria may include, but is not limited to, at least one of loyalty program tier, in casino spending, and in game behavior.

The server 106-114 may receive an indication that the player has left the EGM 104A-104X. In response to the indication, the server 106-114 transmits instructions to execute a base game to the EGM 104A-104X. Subsequently, the server 106-114 receives a further indication that the player has initiated play of a wagering game on a second EGM 104A-104X. The server 106-114 then transmits an RTP access level for the player to the second EGM 104A-104X. The second EGM 104A-104X executes a wagering game associated with the RTP access level.

In some embodiments, the server 106-114 provides a control instruction to the EGM 104A-104X that causes the EGM 104A-104X to display, on a display of the EGM 104A-104X, an initial wagering game, the initial wagering game associated with an initial RTP. The server 106-114 then determines that a player of the initial wagering game satisfies at least one eligibility criterion. Satisfaction by the player of the at least one eligibility criterion is a prerequisite to granting the player access to a higher RTP wagering game. The server 106-114 persistently stores an indication that the player has been granted access to the higher RTP wagering game. This indication is in response to determining that the player has satisfied the at least one eligibility criterion. The server 106-114 provides a control instruction to the EGM 104A-104X that causes the EGM 104A-104X to display the higher RTP wagering game.

In some embodiments, the server 106-114 receives an indication that the player has left the electronic gaming machine and provides a control instruction to the EGM 104A-104X that causes the EGM 104A-104X to display the initial wagering game.

In some further embodiments, the server 106-114 provides a control instruction to the EGM 104A-104X that causes the EGM 104A-104X to display to the player, a selection of the initial wagering game and the higher RTP wagering game. In response to the players selection, the server 106-114 provides a control instruction to EGM 104A-104X to execute a wagering game based on the selection. In other embodiments, the EGM 104A-104X receives the selection and displays the selected wagering game without further communication with the server 106-114.

Accordingly, technical effects and technical improvements associated with the electronic gaming systems and methods described herein include, but are not limited to, the following: (i) providing one or more additional wagering games to a player in real-time, such as during play of an initial or base game, in response to the player satisfying one or more eligibility criteria, where at least some of the additional games may provide a higher RTP than the initial or base game RTP; (ii) providing one or more additional wagering games to a player in-real time, such as during play of an already-selected additional wagering game, in response to the player satisfying one or more additional eligibility criteria; (iii) allowing, as a result of these features, a player to build from an initial or base game toward progressively higher RTP game options during game play; (iv) persistently storing, for a predetermined duration, a player's eligibility criteria, such that the player can stop and resume game play without losing access to an earned RTP level; and (v) persistently storing the player's eligibility criteria on a remote server system to permit game transitions between electronic gaming machines networked with the remote server system to permit the player to move between gaming machines without losing access to an earned RTP.

In addition to the technical effects and improvements described above, in many embodiments, it will be appreciated that at least one specific improvement to the technology and technical field is achieved in that an eligibility determination may be processed by the remote server system, such that an electronic gaming machine processor is not required to perform an eligibility determination. Rather, the electronic gaming machine processor may receive an instruction from the remote server system indicating which additional wagering games to provide or "unlock" for a player. As a result, the eligibility determination may take place in real-time, such as, for example, as a player continues to place wagers, achieve new loyalty tiers, and the like, on the remote server system, which may notify the gaming machine occupied by the player as new games are unlocked without otherwise taxing or utilizing the electronic gaming machine processor and/or consuming processor cycles with the steps related to eligibility determination.

Further, although the systems and methods are, in some embodiments, described herein in association with wagering games, it will be appreciated that these systems and methods may be equally implemented in conjunction with non-wagering games and/or wagering games that do not utilize a monetary currency. For instance, the systems and methods described herein can be implemented in association with non-monetary games that use a virtual currency, such as loyalty points. In these examples, an RTP may include a return to player in terms of loyalty points or another virtual currency.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic gaming device comprising:

at least one memory with instructions stored thereon; and at least one processor in communication with the at least one memory, wherein the instructions, when executed by the at least one processor, cause the at least one processor to:

present a first electronic game of a plurality of electronic games, wherein the first electronic game is associated with a first return to player (RTP), a second electronic game of the plurality of electronic games is associated with a second RTP, a third electronic game of the plurality of electronic games is associated with a third RTP, and the second RTP and third RTP are higher than the first RTP;

transmit player account data to a server, wherein the player account data includes a player identifier associated with a player account;

receive eligibility data from the server based upon the player account data, wherein the eligibility data is stored at the server and indicates that the player account has access to the second electronic game and the third electronic game;

cause display of a list including the second electronic game and the third electronic game based upon the eligibility data;

receive a selection of a selected game, the selected game comprising one of the second electronic game or the third electronic game; and present the selected game with a higher RTP than the first RTP and at least one additional symbol associated with the selected game that is not presented during play of the first electronic game.

2. The electronic gaming device of claim 1, wherein the instructions further cause the at least one processor to:

receive an input associated with the player identifier; and determine the player identifier based on the input.

3. The electronic gaming device of claim 1, wherein the first electronic game, the second electronic game, and the third electronic game have a shared theme.

4. The electronic gaming device of claim 3, wherein the at least one additional symbol is associated with the shared theme.

5. The electronic gaming device of claim 1, wherein the first RTP is associated with a first lookup table, the second RTP is associated with a second lookup table, and the third RTP is associated with a third lookup table.

6. The electronic gaming device of claim 5, wherein the instructions further cause the at least one processor to:

receive a message associated with an output for the first electronic game from a computing device, wherein the output is determined based on the first lookup table; and provide the output for the first electronic game based on the message.

7. The electronic gaming device of claim 1, wherein the instructions further cause the at least one processor to determine that the player account has access to the second electronic game and the third electronic game while the first electronic game is being provided.

8. The electronic gaming device of claim 1, wherein the instructions further cause the at least one processor to, while the first electronic game is being provided, cause display of a message communicating that the player account has access to the second electronic game and the third electronic game.

9. The electronic gaming device of claim 1, wherein the instructions further cause the at least one processor to store the eligibility data.

10. The electronic gaming device of claim 9, wherein the instructions further cause the at least one processor to:

pause play of the selected game; and resume play of the selected game based at least in part upon the eligibility data that is stored.

11. The electronic gaming device of claim 1, wherein the eligibility data is associated with play of the first electronic game associated with the player account that occurred at a different electronic gaming device from the electronic gaming device.

12. At least one non-transitory computer-readable storage medium with instructions stored thereon that, in response to execution by at least one processor, cause the at least one processor to:

execute a first electronic game of a plurality of electronic games, wherein the first electronic game is associated with a first return to player (RTP), a second electronic game of the plurality of electronic games is associated with a second RTP, a third electronic game of the plurality of electronic games is associated with a third RTP, and the second RTP and third RTP are higher than the first RTP;

transmit player account data to a server, wherein the player account data includes a player identifier associated with a player account;

receive eligibility data from the server based upon the player account data, wherein the eligibility data is stored at the server and indicates that the player account has access to the second electronic game and the third electronic game;

cause display of a list including the second electronic game and the third electronic game based upon the eligibility data;

receive a selection of a selected game, the selected game comprising one of the second electronic game or the third electronic game; and execute the selected game with a higher RTP than the first RTP and at least one additional symbol associated with the selected game that is not provided during play of the first electronic game.

13. The at least one non-transitory computer-readable storage medium of claim 12, wherein the instructions further cause the at least one processor to:

receive an input associated with the player identifier; and determine the player identifier based on the input.

14. The at least one non-transitory computer-readable storage medium of claim 12, wherein the first electronic game, the second electronic game, and the third electronic game have a shared theme.

15. The at least one non-transitory computer-readable storage medium of claim 14, wherein the at least one additional symbol is associated with the shared theme.

16. The at least one non-transitory computer-readable storage medium of claim 12, wherein the first RTP is associated with a first lookup table, the second RTP is associated with a second lookup table, and the third RTP is associated with a third lookup table.

17. The at least one non-transitory computer-readable storage medium of claim 16, wherein the instructions further cause the at least one processor to:

receive a message associated with an output for the first electronic game from a computing device, wherein the output is determined based on the first lookup table; and provide the output for the first electronic game based on the message.

18. The at least one non-transitory computer-readable storage medium of claim 12, wherein the instructions further cause the at least one processor to determine that the player account has access to the second electronic game and the third electronic game while the first electronic game is being executed.

19. The at least one non-transitory computer-readable storage medium of claim 12, wherein the instructions further cause the at least one processor to, while the first electronic game is being provided, cause display of a message communicating that the player account has access to the second electronic game and the third electronic game.

20. A method of electronic gaming implemented by at least one processor in communication with at least one memory, the method comprising:

presenting a first electronic game of a plurality of electronic games, wherein the first electronic game is associated with a first return to player (RTP), a second electronic game of the plurality of electronic games is associated with a second RTP, a third electronic game of the plurality of electronic games is associated with a third RTP, and the second RTP and third RTP are higher than the first RTP;

transmitting player account data to a server, wherein the player account data includes a player identifier associated with a player account;

receiving eligibility data from the server based upon the player account data, wherein the eligibility data is stored at the server and indicates that the player account has access to the second electronic game and the third electronic game;

displaying of a list including the second electronic game and the third electronic game based upon the eligibility data;

receiving a selection of a selected game, the selected game comprising one of the second electronic game or the third electronic game; and providing the selected game with a higher RTP than the first RTP and at least one additional symbol associated with the selected game that is not provided during play of the first electronic game.

* * * * *